United States Patent Office 3,784,609
Patented Jan. 8, 1974

---

3,784,609
ALLYLIC SUBSTITUTION OF OLEFINS
Robert Schwenn Neale, Ossining, N.Y., assignor to Union
Carbide Corporation, New York, N.Y.
No Drawing. Filed Oct. 19, 1970, Ser. No. 82,172
Int. Cl. C07c 41/06
U.S. Cl. 260—611 R                    7 Claims

ABSTRACT OF THE DISCLOSURE

A liquid phase process for the production of allyl ethers comprising admixing an olefin, a nucleophilic solvent (an alcohol), an organic hydroperoxide, and an exchange promoter selected from the group consisting of acids having a pKa value of less than 3 and salts formed from such acids and nitrogen bases having a pKa value greater than 5 in the presence of a catalyst compound containing copper in a +1 or +2 oxidation state, at least $1 \times 10^{-5}$ mol of said catalyst compound per mol of hydroperoxide being present in the admixture in a solubilized state.

FIELD OF THE INVENTION

This invention relates to a process for the allylic substitution of olefins; and, more particularly, to a catalytic process for introducing an alkoxy group at the allylic position of an alkene or cycloalkene to form an allyl ether.

DESCRIPTION OF THE PRIOR ART

Allyl ethers are well known intermediates in the chemical industry for the production of glycidyl ethers, silicone containing surfactants and various copolymers and terpolymers derived in part from olefin monomers. The production of these intermediates by the autoxidation of olefins, however, is strikingly inefficient in that it leads to the formation of allylic hydroperoxides or their decomposition products together with oxidation of the double bond, e.g., the use of ordinary molecular oxygen is not feasible because of its failure to react selectively at the allylic position to introduce alkoxy groups. To overcome the problems raised by autoxidation, various organic hydroperoxides have been proposed as oxidants because of their economic advantage over other peroxidic compounds, but processes of this nature have merely led to the formation of mixed peroxides ROOR' instead of the desired mixed ethers ROR'.

SUMMARY OF THE INVENTION

An object of this invention, therefore, is to provide a one-step process for the allylic substitution of olefins wherein hydroperoxides can be used efficiently and formation of mixed peroxides is suppressed.

Other objects and advantages will become apparent hereinafter.

According to the present invention, such a one-step process for the production of allylic compounds having the following structural formula:

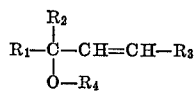

wherein $R_1$ and $R_2$ are hydrogen atoms, straight or branched chain alkyl radicals having 1 to 10 carbon atoms, or alkylene portions of alicyclic rings, each portion having 1 to 5 carbon atoms; $R_3$ is a secondary alkyl radical having 1 to 10 carbon atoms or an unsubstituted or substituted cycloalkyl radical having 4 to 10 carbon atoms in the ring structure, the substituted cycloalkyl radical having as substituents straight or branched chain alkyl radicals having 1 to 5 carbon atoms, provided $R_1$ and $R_2$ are alkyl radicals or alkylene portions of alicyclic rings, or $R_3$ is a hydrogen atom, a straight chain or tertiary alkyl radical having 1 to 10 carbon atoms, or an alkylene portion of an alicyclic ring, said portion having 1 to 5 carbon atoms; and $R_4$ is a straight chain alkyl, alkyl ether, or tertiary alkyl radical, each having 1 to 10 carbon atoms has been discovered comprising admixing an olefin having the following structural formula:

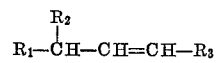

wherein $R_1$, $R_2$, and $R_3$ are as defined above; a nucleophilic solvent having the following structural formula:

wherein $R_4$ is as defined above; a hydroperoxide having the following structural formula:

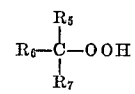

wherein $R_5$, $R_6$, and $R_7$ are straight or branched chain alkyl radicals having 1 to 10 carbon atoms; at least two of the radicals $R_5$, $R_6$, and $R_7$ are alkylene portions of unsubstituted or substituted alicyclic rings, each portion having 1 to 5 carbon atoms, the substituent being a phenyl radical, and the remaining radical being a hydrogen atom or an alkyl radical having 1 to 10 carbon atoms; or at least one of the radicals, $R_5$, $R_6$, and $R_7$, is a phenyl or naphthyl radical and the remaining one or two radicals are hydrogen atoms or alkyl radicals having 1 to 10 carbon atoms; and an exchange promoter selected from the group consisting of acids having a pKa value of less than 3 and salts formed from such acids and nitrogen bases having a pKa value greater than 5 in the presence of a catalyst compound containing copper in a +1 or +2 oxidation state, at least $1 \times 10^{-5}$ mol of said catalyst compound per mol of hydroperoxide being present in the admixture in a solubilized state.

DESCRIPTION OF THE PREFERRED EMBODIMENT

The process can be carried out by first introducing an olefin, a nucleophilic solvent, an exchange promoter, and a catalyst into a reaction vessel followed by the incremental introduction of hydroperoxide.

The reaction vessel can be glass, glass-lined, aluminum, titanium or stainless steel. A glass-lined polytetrafluoroethylene coated stainless steel autoclave is found to be advantageous. A tubular reactor made of similar materials can also be used together with multi-point injection to maintain a particular ratio of reactants.

Some form of agitation is preferred to avoid a static system and can be accomplished by using a mechanically stirred autoclave, a multi-point injection system, or a loop reactor wherein the reactants are force circulated through the system. Sparging can also be used. It should be pointed out that agitation is inherent where the process is carried out in a continuous manner although the various modes suggested further enhance the homogeneity of the liquid reactants therein.

As set forth above, the olefin has the following structural formula:

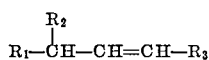

wherein $R_1$ and $R_2$ are hydrogen atoms, straight or branched chain alkyl radicals having 1 to 10 carbon atoms, or alkylene portions of alicyclic rings, each portion having 1 to 5 carbon atoms; $R_3$ is a secondary alkyl radical having 1 to 10 carbon atoms or an unsubstituted or substituted cycloalkyl radical having 4 to 10 carbon atoms in the ring structure, the substituted cycloalkyl radical having as substitutents straight or branched chain alkyl radicals having 1 to 5 carbon atoms, provided $R_1$ and $R_2$ are alkyl radicals or alkylene portions of alicyclic rings, or $R_3$ is a hydrogen atom, a straight chain or tertiary alkyl radical having 1 to 10 carbon atoms, or an alkylene portion of an alicyclic ring, said portion having 1 to 5 carbon atoms. These olefins are exemplified by propylene, butene-1, butene-2, pentene-1, hexene-1, pentene-2, cyclopentene, cyclohexene, cyclooctene, heptene-1, octene-1, hexene-2, hexene-3, octene-2, heptene-3, dodecene-2, cyclobutene, cycloheptene, 3-methyl-1-butene, vinylcyclohexane, 3-methylcyclohexene, 2 - vinyl-bicyclo [2.2.1] heptane, 7-vinyl-bicyclo [2.2.1] heptane, 2,2-dimethyl - 3 - hexene, 5,5 - dimethyl - 3 - heptene, 2,5-dimethyl-3-hexene, 1 - methyl-1-(1-pentenyl)cyclohexane, and 6-methyl-3-heptene.

As its name implies, the nucleophilic solvent acts as a solvent for the materials used in the process and thus assists in maintaining the reaction in the liquid phase. The compound also acts in a nucleophilic capacity by substituting its $R_4O$ moiety for a hydrogen atom at the allylic position of the olefin during the reaction. Examples of nucleophilic solvents corresponding to the above definition are methyl alcohol, ethyl alcohol, n-propyl alcohol, n-butyl alcohol, isobutyl alcohol, t-butyl alcohol, n-amyl alcohol, isoamyl alcohol, t-amyl alcohol, neopentyl alcohol, n-hexyl alcohol, n-octyl alcohol, and n-decyl alcohol.

The hydroperoxide is represented by the following structural formula:

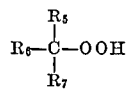

wherein $R_5$, $R_6$, and $R_7$ are straight or branched chain alkyl radicals having 1 to 10 carbon atoms; at least two of the radicals $R_5$, $R_6$, and $R_7$ are alkylene portions of unsubstituted or substituted alicyclic rings, each portion having 1 to 5 carbon atoms, the substituent being a phenyl radical, and the remaining radical being a hydrogen atom or an alkyl radical having 1 to 10 carbon atoms; or at least one of the radicals, $R_5$, $R_6$, and $R_7$, is a phenyl or naphthyl radical and the remaining one or two radicals are hydrogen atoms or alkyl radicals having 1 to 10 carbon atoms. Examples of useful hydroperoxides are tert-butyl hydroperoxide, tert-amyl hydroperoxide, neopentyl hydroperoxide, cumyl hydroperoxide, 1-phenylethyl hydroperoxide, tetralyl hydroperoxide, 1-methylcyclohexyl hydroperoxide, 1-hydroperoxybicyclo [2.2.2] octane, 1,1-dicyclohexylethyl hydroperoxide, 1-methyl-1-(1-naphthyl) ethyl hydroperoxide, 1-hydroperoxybicyclo [2.2.1] heptane.

The exchange promoter, which is believed to be responsible for the selective substitution of the nucleophile and the suppression of mixed peroxide formation in the instant process, is either an acid having a pKa value of less than 3 or the salt formed from the reaction of such an acid with a nitrogen base having a pKa value greater than 5.

The pKa value is the negative logarithm of the dissociation constant of the acid or the protonated base and as used herein is referred to water. The preferred pKa value for the acid is less than 0 and the preferred pKa value for the base is greater than 8.

Where the catalyst compound is such that it reacts with the acid, the acid should be one whose copper salt is sufficiently soluble in the liquid admixture to provide the required amount of catalyst in the solubilized state. If the salt is not sufficiently soluble it will take the copper cation out of solution where it will be inactive as a catalyst. The definition of catalyst concentration, therefore, is in effect a limitation on the acid selected for the exchange promoter.

Examples of acids useful as exchange promoters are hydrochloric acid, perchloric acid, nitric acid, the sulfonic acids such as p-toluenesulfonic acid, naphthalene-beta-sulfonic acid, and methanesulfonic acid, trifluoroacetic acid, trichloroacetic acid, dichloroacetic acid, hydrofluoric acid, and arsenic acid.

Examples of salts useful as exchange promoters are ammonium chloride, 9,10-phenanthrolinium perchlorate, ammonium p-toluenesulfonate, methylammonium nitrate, ammonium nitrate, t-butyl-ammonium arsenate, t-octyl-ammonium trifluoroacetate, and trimethylammonium fluoride.

A feature of this invention is the discovery that the reaction rate of subject process can be increased as well as efficiencies by the introduction of small amounts of a basic additive defined as a nitrogen base having a pKa value of greater than 5 and preferably greater than 8 or the salt of such a nitrogen base. The latter, of course, can have the same definition as the exchange promoter salt and can be one and the same. Ammonium chloride or ammonium nitrate perform the dual function and are, therefore, preferred compounds in this invention. Other examples of the basic additive are ammonia, ammonium hydroxide, 9,10 - phenanthroline, methylamine, t-butylamine, pyrrolidine, beta-picoline, pyridine, t-octylamine, t-amylamine, trimethylamine, and 2,2-dipyridyl.

The catalyst compound has been defined as one containing copper in a +1 or +2 oxidation state and must be sufficiently soluble in the admixture to the extent that at least $1 \times 10^{-5}$ mol of catalyst per mol of hydroperoxide is present in the solubilized state. The copper compound added to the mixture can either be soluble in its own right or one that will react with the exchange promoter acid or the hydroperoxide to form a salt having the required solubility. The copper compounds added can be in any form, salt or complex, or the copper can be introduced in its ionized state via a solution in which the original copper compound was dissolved. Examples of useful copper compounds are cuprous or cupric bromide, chloride, iodide, or fluoride. Other examples are $CuOC_6H_5$, $Cu(OC_6H_5)_2$, $CuSO_4$, 1,10 - phenanthroline copper complex, alpha-alpha-bipyridyl copper complex, cuprous acetate, cupric octanoate, diammine copper (II) dichloride, copper arsenide, cupric perchlorate, cupric nitrate, tetramminecopper (II) sulfate, and dipyridine copper (II) dichloride.

The amount of olefin which can be introduced into the admixture can be in the range of about 1 mol to about 20 mols of olefin per mol of hydroperoxide and is preferably in the range of about 2.5 to about 10 mols of olefin per mol of hydroperoxide. The nucleophilic solvent used in the process can be in the range of about 5 to about 100 mols of nucleophile per mol of hydroperoxide, but is preferably in the range of about 18 to about 50 mols of nucleophile per mol of hydroperoxide.

As noted above, a catalytic compound must be present in the admixture in a solubilized state in an amount of at least $1 \times 10^{-5}$ mol per mol of hydroperoxide. The preferred range, however, is about $1 \times 10^{-3}$ mol to about $1 \times 10^{-1}$ mol per mol of hydroperoxide. Higher amounts of catalyst can be present in the solubilized state, but no advantage is observed. It should be remembered that the measure of catalytic compound is based on the amount in solution and it is immaterial as to whether the dissolved catalyst is the copper compound introduced or the product of a reaction between such copper compound and the exchange promoter acid, basic additive, or hydroperoxide.

Both the exchange promoter and the basic additive can be introduced in amounts falling into the same ranges. At least about 2 mols of each per mol of catalyst should be used and about 4 mols to about 20 mols of each per mol of catalyst is preferred. There is no advantage in using amounts greater than 20 mols per mol of catalyst and since such amounts may be reactive it is not desirable. The additives may be added dropwise, in portions, or at one time. Where the exchange promoter performs a dual function such as ammonium chloride, it is not necessary to double the molar amounts.

Ratios can be kept constant by the use of a continuous process and by analyzing the outlet ratio and adjusting the feed ratio. In a backmixed reactor, the feed is adjusted until the outlet ratio is within the prescribed range. Where two or more reactors are used in series or the reactor is tubular with multi-point injection, the reactions taking place are considered to be a series of batch reactions and are carefully monitored to insure that the molar ratio in any one reaction is not permitted to go below or rise above the prescribed range.

The temperature of the reaction is not critical and can be in the range of from below room temperature to 200° C. or even higher and is preferably in the range of about 50° C. to about 100° C. or at the reflux temperature of the reaction mixture. Temperatures lower than about 40° C. give slow reaction rates, while temperatures above 200° C. are found to be impractical in view of the high pressures which often result in closed systems.

The pressure under which the reaction is maintained is also not critical and is generally atmospheric pressure. Subatmospheric and superatmospheric pressures can be used if desired. There are no limits except the practical limitation in cost and size of the reactor. Pressures of atmospheric to about 1000 pounds per square inch absolute (p.s.i.a.) can be used in commercial operations although pressures between about 300 and 600 pounds per square inch gauge (p.s.i.g.) are in general use.

The atmosphere in the reaction vessel can be, and is preferably, comprised of nitrogen or other inert gas.

This process can be run in a batchwise or continuous operation, the latter being preferred. Generally, the order of introduction of the reactants is determined by the operator based on what is most practical under prevalent conditions and is not of a critical nature. The hydroperoxide is preferably added last and incrementally, however, and is desirably diluted with the nucleophilic solvent. Water need not be excluded from the mixture and small amounts may be added where required to maintain a soluble catalytic copper species in the pre-dominantly non-aqueous solution. Reaction times are also not critical and may be determined by the operator on the basis of analysis and experience. Common reaction times are from about 1 to about 9 hours. Conditions are preferably adjusted to provide reaction times in the 1 to 2 hour range.

Recovery, separation and analysis of products and unreacted materials are accomplished by conventional means.

The percent yield of allyl ether is calculated as follows:

$$\frac{\text{No. of mols of ether formed}}{\text{No. of mols of hydroperoxide fed}} \times 100$$

The percent yield of mixed peroxide formed is calculated as follows:

$$\frac{\text{No. of mols of mixed peroxide formed}}{\frac{1}{2}\text{ No. of mols of hydroperoxide fed}} \times 100$$

An additional feature of this invention is that it can be expanded in one respect to cover a wide variety of allylic substitution processes in addition to the above described process for the formation of allyl ethers. It has been discovered that in a process for the allylic substitution of olefins comprising admixing an olefin, a non-acyl radical containing nucleophilic solvent, and a hydroperoxide in the presence of a catalyst, allylic substitution by the nucleophile will be favored and mixed peroxide formation suppressed by the introduction of the exchange promoter heretofore defined.

In this process, the olefin and hydroperoxide are as defined above as well as the conditions of the process such as amounts of the components used, temperature, pressure, etc.

The non-acyl radical containing nucleophilic solvent covers, in addition to the alcohols heretofore defined, nitriles, amines, including ammonium hydroxide, and water. The nitriles can be selected from the group consisting of saturated aliphatic nitriles having up to 10 carbon atoms in the non-nitrilic moiety and saturated cycloaliphatic nitriles having up to 15 carbon atoms in the non-nitrilic moiety and up to 6 carbon atoms in each ring, and mixtures thereof. Primary, secondary and tertiary nitriles are contemplated with the primary and tertiary being preferred. The desired nitriles are exemplified by the following structural formula:

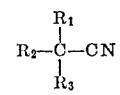

wherein $R_1$, $R_2$, and $R_3$ are alkyl groups; hydrogen atoms; or alkylene portions of an alicyclic ring. Examples are as follows: acetonitrile, propionitrile, butyronitrile, isobutyronitrile, valeronitrile, isovaleronitrile, capronitrile, isocapronitrile, heptanonitrile, isoheptanonitrile, caprylonitrile, 3-methylheptanonitrile, pivalonitrile, cyclopentanecarbonitrile, and cyclohexanecarbonitrile. Preferred nitriles are acetonitrile, propionitrile, butyronitrile, methylcyclohexylnitrile, and pivalonitrile.

Examples of amines are as follows: ammonia, dimethylamine, N-methylaniline, t-butylamine, t-amylamine, t-octylamine, 1-methylcyclohexylamine, pyrrolidine, methylamine, and n-butylamine.

The catalyst covers, in addition to the copper containing compounds described, iron compounds wherein the iron is in or is converted by the reactants to a +2 or +3 oxidation state. Examples of useful iron catalyst compounds are ferrous ammonium sulfate, ferrous octanoate, di-9,10-phenanthroline iron (II) perchlorate, ferrous bromide, iron pentacarbonyl, ferric nitrate, hexammine iron (II) dichloride, and ferrous perchlorate.

As noted, the amounts of nucleophilic solvent and catalyst as well as other conditions are the same as heretofore described in the process for the production of allyl ethers.

The following examples illustrate the invention. Parts are by weight.

Examples 1 to 34

Cyclohexene, a portion of the methanol, the catalyst, exchange promoter, basic additive, and water (if any) are introduced into a glass reaction vessel equipped with a thermometer, an addition funnel, a condenser, a rubber septum, and a mechanical stirrer. The mixture is heated to reflux under nitrogen cover and the dropwise addition of tert-butyl hydroperoxide diluted with an equal volume of methanol is initiated. At the end of the reaction, the mixture is analyzed for 3-methoxycyclohexene and, where noted, 2-cyclohexenyl t-butyl peroxide. Variable conditions and results are found in the following table:

wherein $R_5$, $R_6$, and $R_7$ are straight or branched chain alkyl radicals having 1 to 10 carbon atoms; at least two

TABLE

| Ex. | Cyclo-hexene (milli-mols) | t-Butyl hydro-peroxide (milli-mols) | CuBr cata-lyst (milli-mols) | Exchange promoter | Milli-mols of ex-change pro-moter | Basic additive | Milli-mols of basic addi-tive | Milli-mols of meth-anol | Milli-mols of water [c] | Tem-pera-ture range (°C.) | No. of hrs. of dropwise addition of hydro-peroxide | Total reac-tion time (hrs.) | Yield of ether based on hydro-peroxide (percent) | Yield of mixed peroxide based on hydro-peroxide (percent) |
|---|---|---|---|---|---|---|---|---|---|---|---|---|---|---|
| 1 | 350 | 125 | 2.5 | None | | None | | 2,350 | 40 | 58-59 | 1.8 | 4.0 | 5 | 54 |
| 2 | 350 | 125 | 1.25 | ...do | | (CH$_3$)$_4$NBr | 12 | 2,100 | 880 | 57-58 | 4.2 | 6.8 | <5 | 55 |
| 3 | 350 | 125 | 2.5 | HCl | 50 | None | | 2,200 | 560 | 56-58 | 2.5 | 6.1 | 28 | 0 |
| 4 | 350 | 125 | 2.5 | HCl | 25 | ...do | | 2,350 | 130 | 57-60 | 1.5 | 3.5 | 33 | 0 |
| 5 | 350 | 125 | 2.5 | HCl | 25 | ...do | | 2,350 | 130 | [b] | 0.9 | 49.7 | 44 | 0 |
| 6 | 350 | 125 | 2.5 | NH$_4$Cl | 25 | [a] | | 2,350 | 40 | 48-58 | 2.0 | 3.0 | 41 | 0 |
| 7 | 70 | 12.5 | 0.5 | None | | (CH$_3$)$_4$NCl | 5 | 494 | 0 | 55-60 | 1.0 | 1.75 | 12 | 41 |
| 8 | 70 | 12.5 | 0.5 | NH$_4$Cl | 5 | [a] | | 494 | 0 | 55-60 | 1.0 | 1.5 | 53 | [f] |
| 9 | 70 | 12.5 | 0.25 | NH$_4$Cl | 5 | [a] | | 494 | 0 | 55-60 | 1.2 | 1.5 | 53 | [f] |
| 10 | 70 | 12.5 | 0.25 | HCl | 5 | None | | 494 | 19 | 55-60 | 1.25 | 6.5 | 52 | [f] |
| 11 | 70 | 12.5 | 0.25 | None | | NH$_3$ | 5 | 494 | 15 | 55-60 | 1.3 | 2.25 | 11 | 50 |
| 12 | 70 | 12.5 | 0.25 | [d] | 5 | NH$_3$ | 6.2 | 494 | 23 | 55-60 | 1.3 | 2.7 | 56 | [f] |
| 13 | 70 | 12.5 | 0.25 | [d] | 1 | NH$_3$ | 1.2 | 494 | 4 | 55-60 | 1.6 | 2.2 | 51 | [f] |
| 14 | 70 | 12.5 | 0.25 | [d] | 1 | [e] | 1.0 | 494 | 1 | 55-60 | 1.6 | 8.6 | 46 | [f] |
| 15 | 70 | 12.5 | 0.25 | H$_3$BO$_3$ | 5 | None | | 494 | 0 | 55-60 | 1.25 | 6.5 | 9 | 38 |
| 16 | 35 | 12.5 | 0.25 | NH$_4$Cl | 5 | [a] | | 550 | 0 | 55-60 | 1.1 | 1.5 | 42 | [f] |
| 17 | 120 | 12.5 | 0.25 | [d] | 1 | NH$_3$ | 3.6 | 408 | 10 | 55-60 | 1.2 | 1.75 | 60 | [f] |
| 18 | 125 | 12.5 | 0.25 | [d] | 1 | NH$_3$ | 3.75 | 408 | 1 | 55-60 | 1.6 | 1.8 | 66 | [f] |
| 19 | 70 | 25 | 0.5 | NH$_4$Cl | 5 | [a] | | 494 | 0 | 55-60 | [h] | 1.0 | 21 | [f] |
| 20 | 70 | 25 | 0.5 | NH$_4$Cl | 5 | [a] | | 494 | 0 | 55-60 | 1.5 | 1.9 | 43 | [f] |
| 21 | 70 | 12.5 | 0.5 | NH$_4$Cl | 5 | [a] | | 494 | 0 | 55-60 | [h] | 1.0 | 33 | [f] |
| 22 | 70 | 25 | 1 | NH$_4$Cl | 5 | [a] | | 494 | 0 | 55-60 | 1.7 | 2.0 | 45 | [f] |
| 23 | 70 | 25 | 0.1 | NH$_4$Cl | 5 | [a] | | 494 | 0 | 55-60 | 1.9 | 2.0 | 38 | [f] |
| 24 | 70 | 12.5 | 0.5 | [d] | 1 | NH$_3$ | 5 | 494 | 12.5 | 55-60 | 1.25 | 1.5 | 52 | [f] |
| 25 | 70 | 12.5 | 0.5 | NH$_4$Cl | 5 | [a] | | 494 | 0 | 55-60 | 1.0 | 1.5 | 44 | [f] |
| 26 | 70 | 12.5 | 0.25 | NH$_4$Cl | 5 | [a] | | 494 | 0 | 55-60 | 1.0 | 1.5 | 44 | [f] |
| 27 | 70 | 12.5 | 0.25 | NH$_4$Cl | 5 | [a] | | 494 | 0 | 55-60 | 1.1 | 1.5 | 49 | [f] |
| 28 | 70 | 12.5 | 0.25 | NH$_4$Cl | 5 | [a] | | 494 | 0 | 58 | 1-1.25 | 1.3-2 | 58 | [f] |
| 29 | 70 | 12.5 | g 0.25 | NH$_4$Cl | 5 | [a] | | 494 | 0 | 58 | 1-1.25 | 1.3-2 | 50 | 2 |
| 30 | 70 | 12.5 | 0.25 | | | | | 494 | 0 | 58 | 1-1.25 | 3.8 | 10 | 41 |
| 31 | 70 | 12.5 | 0.25 | HClO$_4$ | 2.5 | NH$_3$ | 5 | 494 | 6.1 | 58 | 1-1.25 | 1.3-2 | 46 | 6 |
| 32 | 70 | 12.5 | 0.25 | NH$_4$ClO$_4$ | 2.5 | NH$_3$ | 2.5 | 494 | 0 | 58 | 1-1.25 | 1.3-2 | 47 | [f] |
| 33 | 70 | 12.5 | 0.25 | NH$_4$NO$_3$ | 2.5 | NH$_3$ | 1 | 494 | 0 | 58 | 1-1.25 | 1.3-2 | 59 | [f] |
| 34 | 115 | 12.5 | 0.25 | NH$_4$NO$_3$ | 2.5 | NH$_3$ | 1 | 390 | 0 | 58 | 1-1.25 | 1.3-2 | 70 | [f] |

[a] NH$_4$Cl serves a dual function.
[b] Two temperature ranges are used, 24° to 30° C. for the first one quarter of hydroperoxide reacted and 51° to 59° C. for the balance.
[c] Water is present as 4 percent by weight of hydroperoxide throughout. This water is also included in the "millimols of water" column in examples 1 to 6.
[d] p-Toluenesulfonic acid.
[e] 9,10-phenanthroline.
[f] Yield of mixed peroxide not determined.
[g] CuCl instead of CuBr.
[h] All initially.

What is claimed is:

1. A liquid phase process for the production of allylic compounds having the following structural formula:

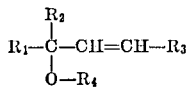

wherein $R_1$ and $R_2$ are hydrogen atoms, straight or branched chain alkyl radicals having 1 to 10 carbon atoms, or alkylene portions of alicyclic rings, each portion having 1 to 5 carbon atoms; $R_3$ is a secondary alkyl radical having 1 to 10 carbon atoms or an unsubstituted or substituted cycloalkyl radical having 4 to 10 carbon atoms in the ring structure, the substituted cycloalkyl radical having as substituents straight or branched chain alkyl radicals having 1 to 5 carbon atoms, provided $R_1$ and $R_2$ are alkyl radicals or alkylene portions of the alicyclic rings, or $R_3$ is a hydrogen atom, a straight chain or tertiary alkyl radical having 1 to 10 carbon atoms, or an alkylene portion of an alicyclic ring, said portion having 1 to 5 carbon atoms; and $R_4$ is a straight chain alkyl, or tertiary alkyl radical, each having 1 to 10 carbon atoms comprising admixing an olefin having the following structural formula:

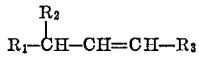

wherein $R_1$, $R_2$, and $R_3$ are as defined above; a nucleophilic solvent having the following structural formula:

wherein $R_4$ is as defined above; a hydroperoxide having the following structural formula:

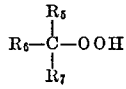

wherein $R_5$, $R_6$, and $R_7$ are alkylene portions of unsubstituted or substituted alicyclic rings, each portion having 1 to 5 carbon atoms, the substituent being a phenyl radical, and the remaining radical being a hydrogen atom or an alkyl radical having 1 to 10 carbon atoms; or at least one of the radicals, $R_5$, $R_6$, and $R_7$ is a phenyl or naphthyl radical and the remaining one or two radicals are hydrogen atoms or alkyl radicals having 1 to 10 carbon atoms; and an exchange promoter selected from the group consisting of acids having a pKa value of less than 3; and salts formed from such acids and nitrogen bases having a pKa value greater than 5 wherein the nitrogen bases are selected from the group consisting of ammonia, ammonium hydroxide, 9,10-phenanthroline, methylamine, t-butylamine, pyrrolidine, beta-picoline, pyridine, t-octylamine, t-amylamine, and trimethylamine in the presence of a catalyst compound containing copper in a +1 or +2 oxidation state and selected from the group consisting of cuprous or cupric bromide, chloride, iodide, or fluoride, CuOC$_6$H$_5$, Cu(OC$_6$H$_5$)$_2$, CuSO$_4$, 1,10-phenanthroline copper complex, alpha-alpha-bipyridyl copper complex, cuprous acetate, cupric octanoate, diammine copper (II) dichloride, copper arsenide, cupric perchlorate, cupric nitrate, tetramminecopper (II) sulfate, and dipyridine copper (II) dichloride wherein for each mol of hydroperoxide there are about 1 mol to about 20 mols of olefin, about 5 to about 100 mols of nucleophilic solvent, and about 1×10⁻¹ to about 1×10⁻³ mol of catalyst, said catalyst being present in the admixture in a solubilized state, and for each mol of catalyst there are at least 2 mols of exchange promoter.

2. The process defined in claim 1 wherein the catalyst compound is selected from the group consisting of cuprous cupric bromide, chloride, iodide, or fluoride.

3. The process of claim 1 wherein for each mol of hydroperoxide there are about 2.5 to about 10 mols of olefin and about 18 mols to about 50 mols of nucleophilic solvent, and for each mol of catalyst there are about 4 to about 20 mols of exchange promoter.

4. The process of claim 3 wherein the exchange promoter is selected from the group consisting of acids having a pKa value of less than 0.

5. The process of claim 3 wherein the olefin is cyclohexene, the nucleophilic solvent is methanol, and the exchange promoter is ammonium chloride.

6. The process of claim 3 wherein the exchange promoter is ammonium nitrate.

7. The process of claim 6 wherein the hydroperoxide is tertiary-butyl hydroperoxide.

References Cited

UNITED STATES PATENTS

| 3,140,303 | 7/1964 | Dela Mare et al. | 260—614 R |
|---|---|---|---|
| 2,847,477 | 8/1958 | Watanabe et al. | 260—614 R X |
| 2,747,247 | 6/1957 | Keith | 260—614 A |
| 3,577,466 | 5/1971 | Nozaki | 260—611 R |
| 3,271,461 | 9/1966 | Stephenson | 260—614 R |
| 3,250,813 | 5/1966 | Stephenson | 260—614 R |
| 2,067,385 | 2/1937 | Evans et al. | 260—614 R |
| 1,968,601 | 7/1934 | Edlund et al. | 260—614 R |

FOREIGN PATENTS

| 984,803 | 3/1965 | Great Britain | 260—614 R |

HOWARD T. MARS, Primary Examiner

U.S. Cl. X.R.

260—614 A, 164 R, 610 R, 615 R, 464, 563 C, 563 R, 570.5 R